(12) United States Patent
Murray et al.

(10) Patent No.: US 9,605,785 B2
(45) Date of Patent: Mar. 28, 2017

(54) CONNECTOR APPARATUS AND DOCKING STATION CONNECTION THEREWTIH

(71) Applicant: Scholle Corporation, Irvine, CA (US)

(72) Inventors: Chris Murray, Chicago, IL (US); Kyle Erickson, Chicago, IL (US)

(73) Assignee: Scholle IPN Corporation, Northlake, IL (US)

( * ) Notice: Subject to any disclaimer, the term of this patent is extended or adjusted under 35 U.S.C. 154(b) by 134 days.

(21) Appl. No.: 14/578,352

(22) Filed: Dec. 20, 2014

(65) Prior Publication Data

US 2016/0178103 A1 Jun. 23, 2016

(51) Int. Cl.
*F16L 37/12* (2006.01)
*B65B 3/04* (2006.01)
*F16L 23/00* (2006.01)
*B05B 1/00* (2006.01)

(52) U.S. Cl.
CPC ............... *F16L 37/12* (2013.01); *B05B 1/00* (2013.01); *B65B 3/04* (2013.01); *F16L 23/00* (2013.01)

(58) Field of Classification Search
CPC . F16L 37/00; F16L 37/12; F16L 23/00; B65B 3/04
USPC .................. 141/10, 114, 313–315, 346, 383
See application file for complete search history.

(56) References Cited

U.S. PATENT DOCUMENTS

| | | | |
|---|---|---|---|
| 4,564,132 A * | 1/1986 | Lloyd-Davies | B65D 77/067 137/614.04 |
| 5,072,756 A * | 12/1991 | Carr | B67D 3/042 137/614.04 |
| 5,255,713 A | 10/1993 | Scholle et al. | |
| 5,746,414 A * | 5/1998 | Weldon | A61M 5/16877 251/149.6 |
| 5,884,648 A * | 3/1999 | Savage | B67D 7/0294 137/1 |
| 5,983,964 A * | 11/1999 | Zielinksi | F16L 29/00 137/614.04 |
| 6,390,156 B1 * | 5/2002 | Hetherington | A23G 9/045 141/2 |
| 8,196,621 B2 * | 6/2012 | Johnson | B67D 1/0082 141/372 |
| 8,479,785 B2 * | 7/2013 | Johnson | B67D 1/0082 141/372 |

(Continued)

FOREIGN PATENT DOCUMENTS

WO 2010047814 A2 4/2010

*Primary Examiner* — Nicolas A Arnett
(74) *Attorney, Agent, or Firm* — The Watson IP Group, PLC; Jovan N. Jovanovic; Vladan M. Vasiljevic

(57) ABSTRACT

A connector apparatus including a body, a fluid supply connection subassembly and a docking station connection subassembly. The body defines a fluid passageway including a first passageway portion and a second passageway portion generally perpendicular to the first passageway portion. The first passageway portion including a first end outlet and the second passageway portion including a second end outlet. The fluid supply connection subassembly is at the first end of the body and includes an elongated probe defined by the first end outlet. The docking station connection subassembly is at the second end of the body and includes an elongated spout defining the second end outlet. The elongated spout extends from a frame including an outside surface and a base rim. The base rim defines a plane with the elongated spout extending therebeyond.

14 Claims, 18 Drawing Sheets

(56) References Cited

U.S. PATENT DOCUMENTS

| | | | |
|---|---|---|---|
| 8,511,639 B2* | 8/2013 | Johnson | B67D 1/0829 |
| | | | 141/346 |
| 8,544,692 B2* | 10/2013 | Rusch | B67D 1/0004 |
| | | | 141/346 |
| 8,622,246 B2* | 1/2014 | Mehus | B67D 3/0006 |
| | | | 222/105 |
| 8,763,857 B2* | 7/2014 | Middleton | B65D 83/0077 |
| | | | 222/103 |
| 8,820,577 B2* | 9/2014 | Rusch | B67B 7/28 |
| | | | 222/129.1 |
| 2006/0043113 A1 | 3/2006 | Verespej et al. | |
| 2010/0193544 A1* | 8/2010 | Rusch | B67B 7/28 |
| | | | 222/82 |
| 2013/0206280 A1* | 8/2013 | Mehus | B67D 3/0006 |
| | | | 141/311 R |
| 2013/0240562 A1* | 9/2013 | Middleton | B65D 83/0077 |
| | | | 222/103 |

* cited by examiner

CONNECTOR APPARATUS AND DOCKING STATION CONNECTION THEREWTIH

CROSS-REFERENCE TO RELATED APPLICATION

NA

BACKGROUND OF THE DISCLOSURE

1. Field of the Disclosure

The invention relates in general to a connector apparatus, and more particularly, to a connector apparatus which allows for the connection of a flexible package, such as a flexible bag, to a docking station.

2. Background Art

The use of flexible bags is well known in the art. Flexible bags can be of the type that includes a plurality of panels that are coupled together by way of a plurality of seals to form a cavity. A spout is provided, typically on one of the panels, which allows access to the cavity. A fitment may be coupled to the spout to provide a means by which to selectively allow access to the cavity.

Such flexible bags are often utilized for the dispensing of different flowable material, such as, for example, liquids, gels, syrups, suspensions and the like. In a number of such configurations, it is necessary to adapt the flexible bag to existing equipment to provide for the benefits of a flexible bag with existing equipment. Problematically, it is difficult to couple conventional flexible bags with fitments to existing equipment without major modification to the flexible bag or to the fitment.

SUMMARY OF THE DISCLOSURE

The disclosure is directed to a connector apparatus comprising a body, a fluid supply connection subassembly and a docking station connection subassembly. The body defines a fluid passageway. The passageway defining a first passageway portion and a second passageway portion generally perpendicular to the first passageway portion. The first passageway portion including a first end outlet and the second passageway portion including a second end outlet. The fluid supply connection subassembly is at the first end of the body. The fluid supply connection subassembly includes an elongated probe defined by the first end outlet. The docking station connection subassembly is at the second end of the body. The docking station connection assembly includes an elongated spout defining the second end outlet. The elongated spout extends from a frame including an outside surface and a base rim. The base rim defines a plane with the elongated spout extending therebeyond.

In some configurations, the docking station connection subassembly further includes a coupling structure which includes a passageway with a fastener receiving portion at an upper end thereof. The passageway is spaced apart from the elongated spout and substantially parallel thereto, and positioned within the frame.

In some configurations, the frame comprises a substantially oval with the base rim defining a plane that is substantially parallel to a plane defined by the second end outlet, and substantially perpendicular to a plane defined by the first end outlet.

In some configurations, the frame includes a first semi-circular end, a second semi-circular end with a pair of rectangular portions extending therebetween so as to define the oval configuration.

In some configurations, the frame defines a width and a length. The length of the frame being larger than the width by approximately a ratio of 3:1.

In some configurations, the first semi-circular end defines a center point. The center point of the first semi-circular end defining a longitudinal axis of the elongated spout.

In some configurations, the elongated spout and the passageway of the coupling structure define a line that bisects the frame along a longitudinal axis extending therethrough.

In some configurations, the fluid supply connection subassembly further comprises a flange spaced apart from the first end outlet defining a proximal end of the elongated probe, and a pair of opposing locking fingers. Each of the locking fingers including a spring post extending outwardly from the body on an opposite side of the flange from the first end opening, a handle portion extending away from a distal end of the spring post away from the first end opening, and a grasping portion extending from the distal end of the spring post toward the first end. The grasping portion terminating between the flange and the first end opening, with a retaining flange extending inwardly from a distal end of the grasping portion, so as to retain an outer rim of a fitment upon insertion of the elongated probe therethrough.

In another aspect of the disclosure, the disclosure is directed to an assembly including a docking station and a connector apparatus. The docking station includes a connector block and an elongated fluid receiving member. The connector block having a block body with an upper surface, a side surface, an upper surface and a lower portion. The lower portion is attachable to a grasping body. The first opening extends through the upper surface of the connector block. The second opening extends through the upper surface of the connector block. The second opening has an upper countersink portion and a lower portion, wherein the lower portion is of a smaller diameter than the upper portion, with a step surface extending therebetween. The elongated fluid receiving member defines a tubular passageway with a first end and a second end. The elongated fluid receiving member extends through the second opening of the connector block, with the first end extending beyond the upper surface of the block body.

The connector apparatus comprises a body, a fluid supply connection subassembly and a docking station. The body defines a fluid passageway. The passageway defining a first passageway portion and a second passageway portion generally perpendicular to the first passageway portion. The first passageway portion including a first end outlet and the second passageway portion including a second end outlet. The fluid supply connection subassembly is at the first end of the body. The fluid supply connection subassembly includes an elongated probe defined by the first end outlet. The docking station connection subassembly is at the second end of the body. The docking station connection assembly includes an elongated spout defining the second end outlet. The elongated spout extends from a frame including an outside surface and a base rim. The base rim defines a plane with the elongated spout extending therebeyond. The first end of the elongated fluid receiving member extends into the second end outlet and into the second passageway portion, with the second end outlet extending into the upper countersink portion of the second opening, and with the base rim interfacing with the upper surface of the block body.

In some configurations, the side surface of the block body substantially corresponds in shape to the frame of the docking station connection subassembly.

In some configurations, the docking station subassembly further includes an opening corresponding to the first opening of the connector block, with the first opening of the connector block including a thread formed thereon. A fastener extends through the opening of the docking station subassembly and into the first opening of the connector block, sandwiching the docking station subassembly therebetween.

In some configurations, the opening of the first docking station subassembly further includes an elongated passageway. The first opening of the connector block includes a countersink portion proximate the upper surface of the block body, with the elongated passageway extending into the countersink portion of the first opening of the connector block upon positioning of the connector apparatus into engagement with the connector block.

In some configurations, the elongated fluid receiving member further includes an upper flange. The upper flange includes an upper surface that limits further movement of the elongated fluid receiving member within the connector block.

In some configurations, the elongated fluid receiving member further includes an upper seal spaced apart from the first end thereof and spaced apart from the second opening of the block body of the connector block.

In some configurations, the fluid supply connection subassembly further comprises a flange spaced apart from the first end outlet defining a proximal end of the elongated probe, and a pair of opposing locking fingers. Each of the locking fingers including a spring post extending outwardly from the body on an opposite side of the flange from the first end opening, a handle portion extending away from a distal end of the spring post away from the first end opening, and a grasping portion extending from the distal end of the spring post toward the first end. The grasping portion terminating between the flange and the first end opening, with a retaining flange extending inwardly from a distal end of the grasping portion, so as to retain an outer rim of a fitment upon insertion of the elongated probe therethrough.

BRIEF DESCRIPTION OF THE DRAWINGS

The disclosure will now be described with reference to the drawings wherein.

DETAILED DESCRIPTION OF THE DISCLOSURE

Figure 1:
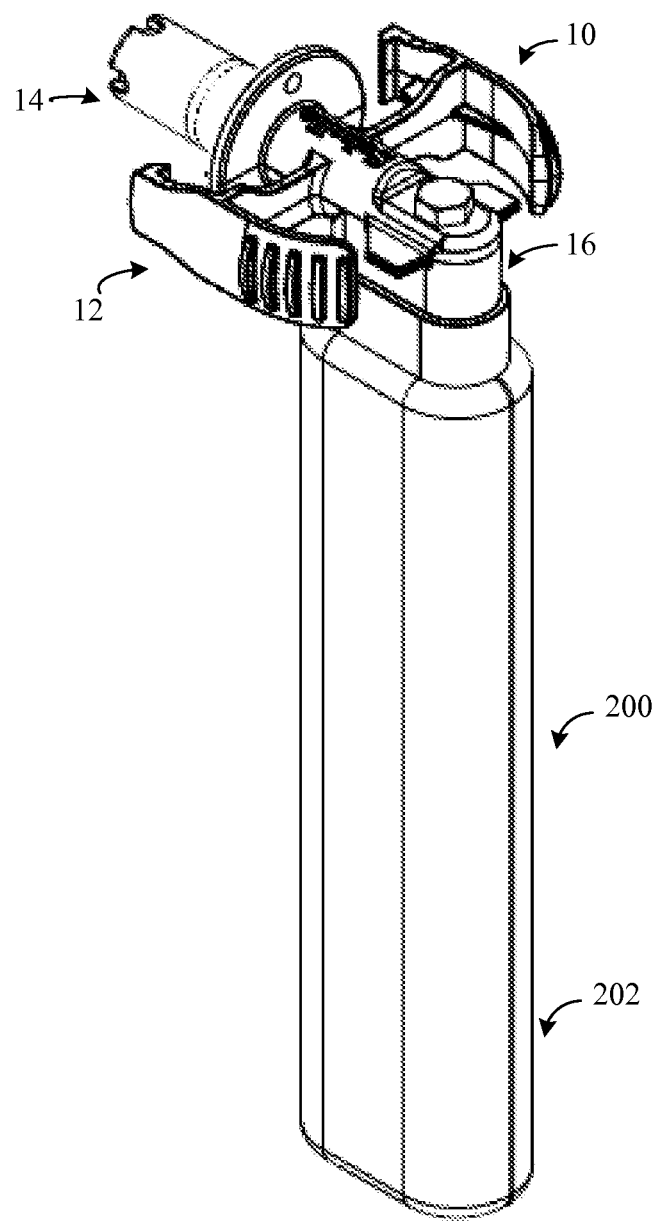
FIG. 1 of the drawings is a perspective view of the connector apparatus of the present disclosure, shown in an orientation wherein the connector apparatus is coupled to a docking station through a connector block thereof.
Figure 2:
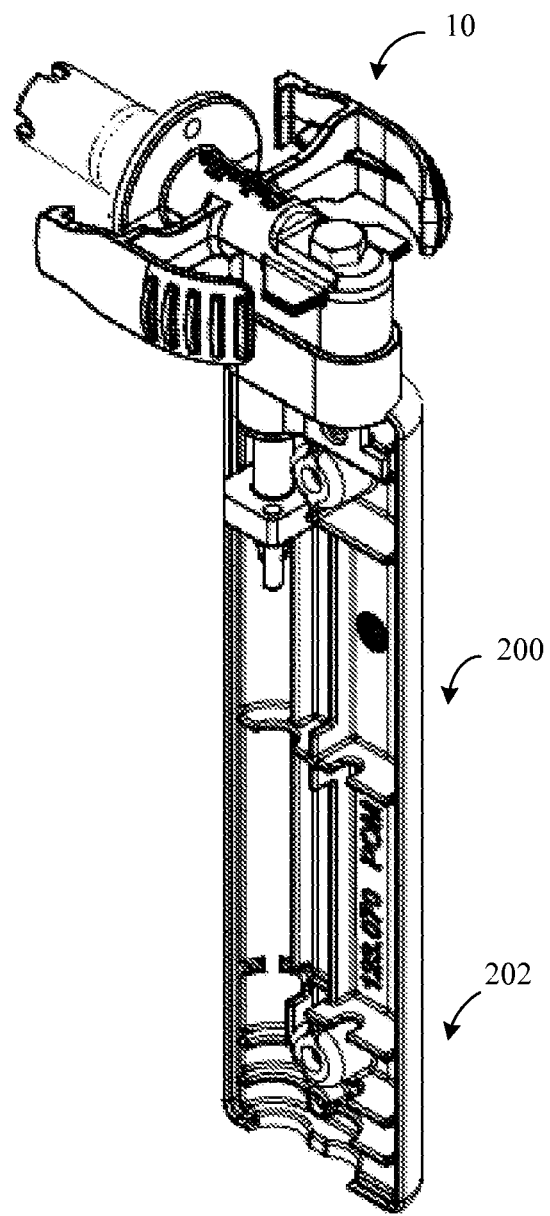
FIG. 2 of the drawings is a perspective view of the connector apparatus of the present disclosure, shown with a portion of the grasping body of the docking station being removed.

While this invention is susceptible of embodiment in many different forms, there is shown in the drawings and described herein in detail a specific embodiment with the understanding that the present disclosure is to be considered as an exemplification and is not intended to be limited to the embodiment illustrated It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the connector apparatus is shown generally at 10. The connector apparatus 10 is configured for coupling, in fluid communication, a reservoir, such as a flexible package, or flexible bag, through, for example, a spout fitment, such as spout fitment 106 (FIG. 4) and a docking station, such as docking station 200. Such a connector provides the communication passageway between the reservoir, through the fitment 106 and the docking station 200 in fluid communication while minimizing leaking. It will be understood that the fitment 106 is coupled to a spout of a flexible bag, wherein the spout provides ingress into the cavity of the flexible bag. In alternate configurations, such as the configuration shown in FIG. 19, the spout may be coupled to a hose or the like, which is coupled to a fitment, and, in turn, a flexible bag that is positioned in a spaced apart configuration relative to the connector apparatus.

Figure 5:
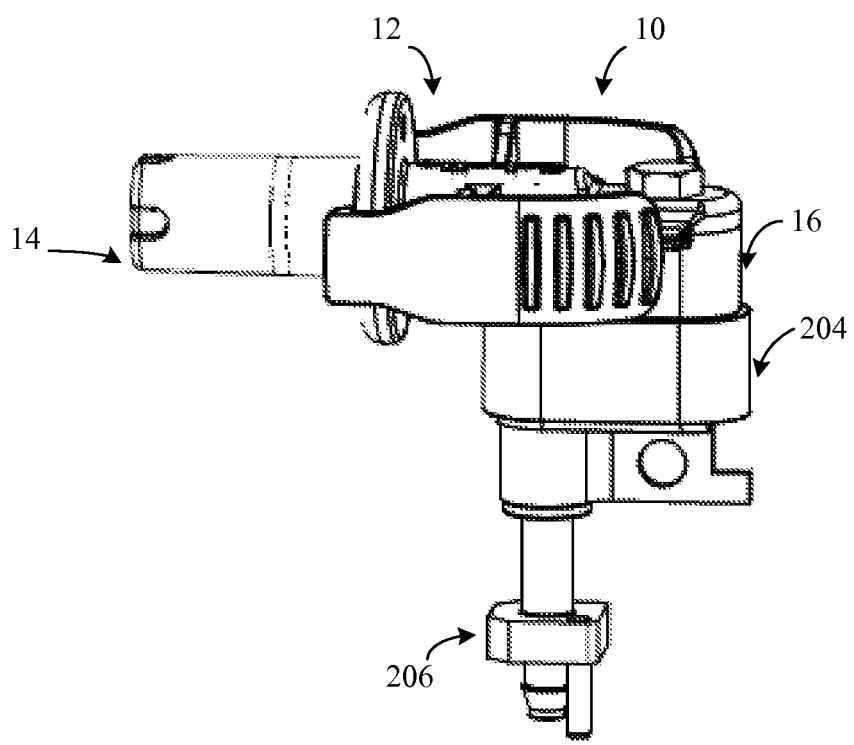
FIG. 5 of the drawings is a perspective view of the connector apparatus, connector block and elongated fluid receiving member in an assembled configuration.
Figure 6:
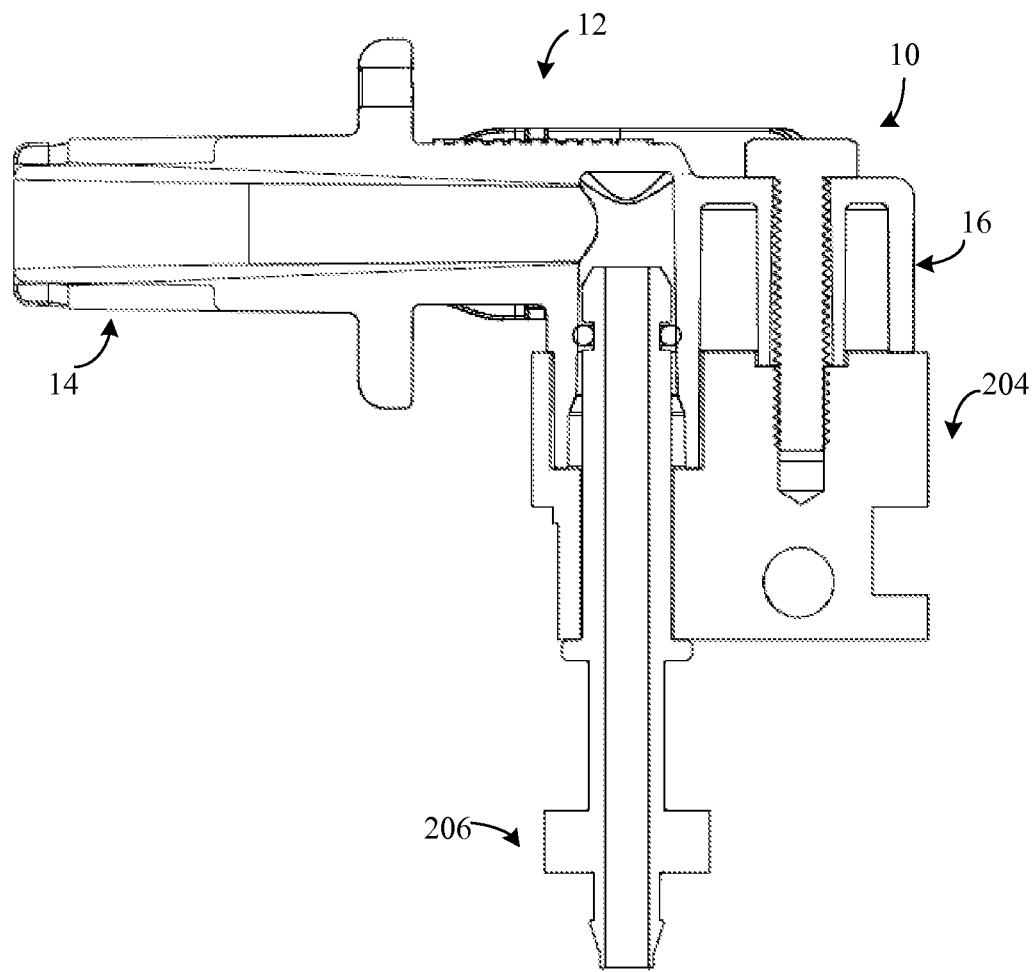
FIG. 6 of the drawings is a cross-sectional view of the connector apparatus, connector block and elongated fluid receiving member in an assembled configuration.
Figure 7:
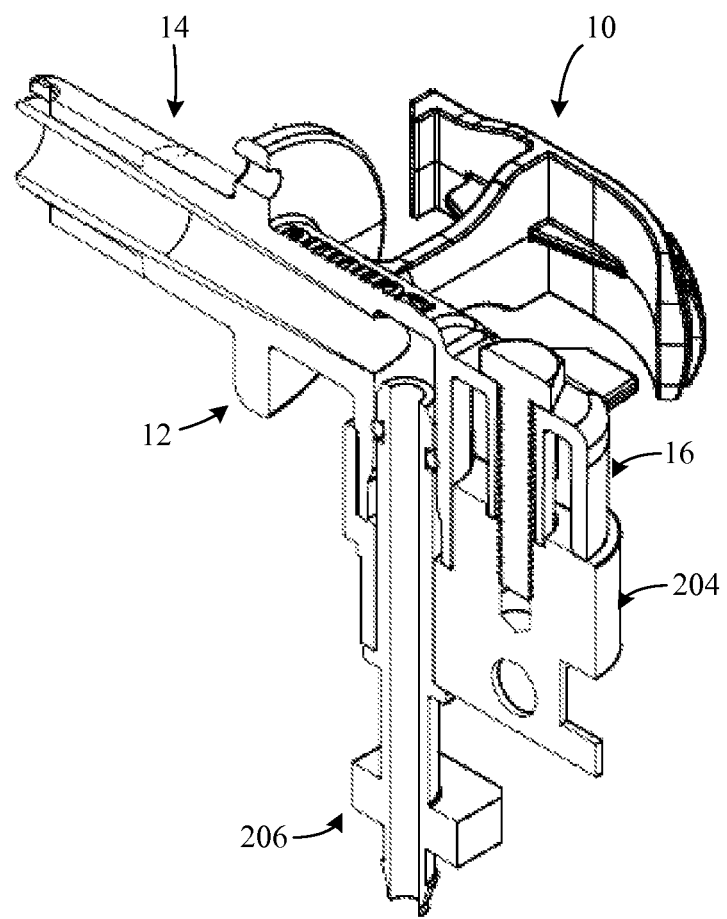
FIG. 7 of the drawings is a perspective cross-sectional view of the connector apparatus, connector block and elongated fluid receiving member in an assembled configuration.
Figure 8:
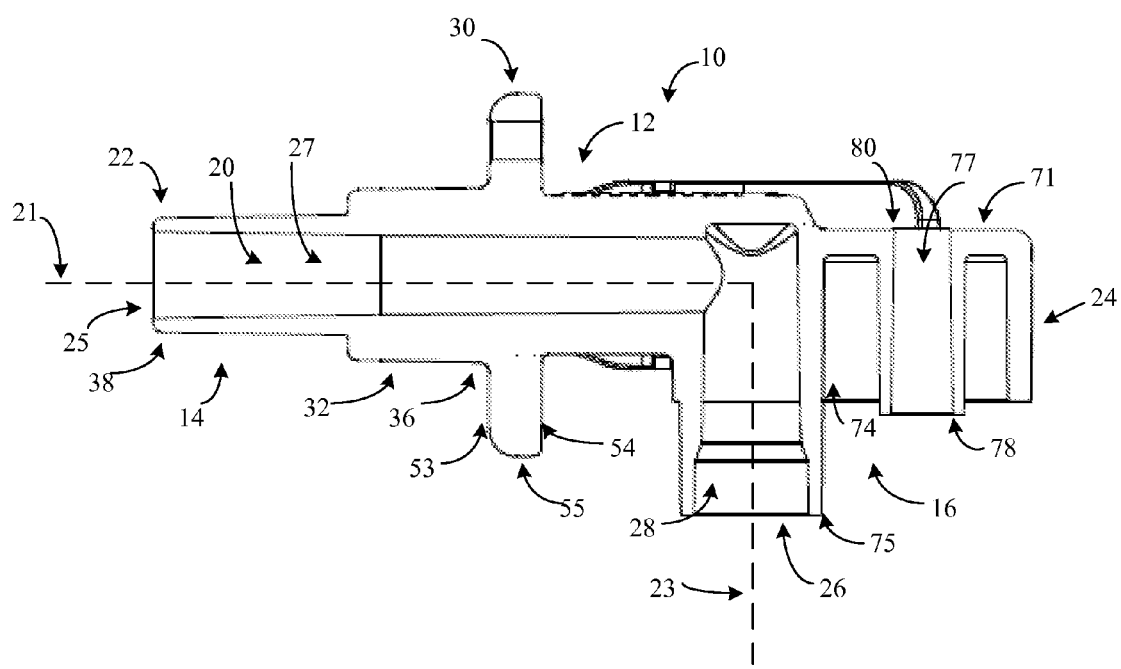
FIG. 8 of the drawings is a cross-sectional view of the connector apparatus of the present disclosure.
Figure 9:
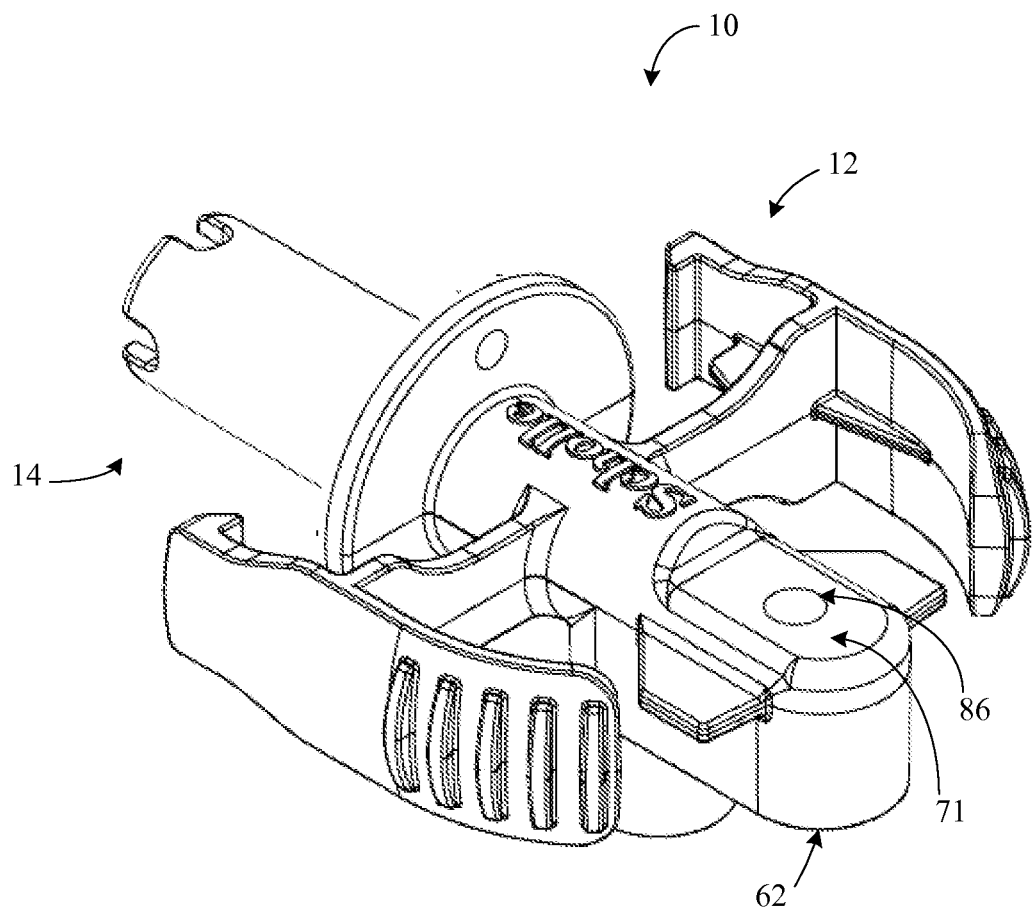
FIG. 9 of the drawings is a perspective view of the connector apparatus of the present disclosure.
Figure 10:
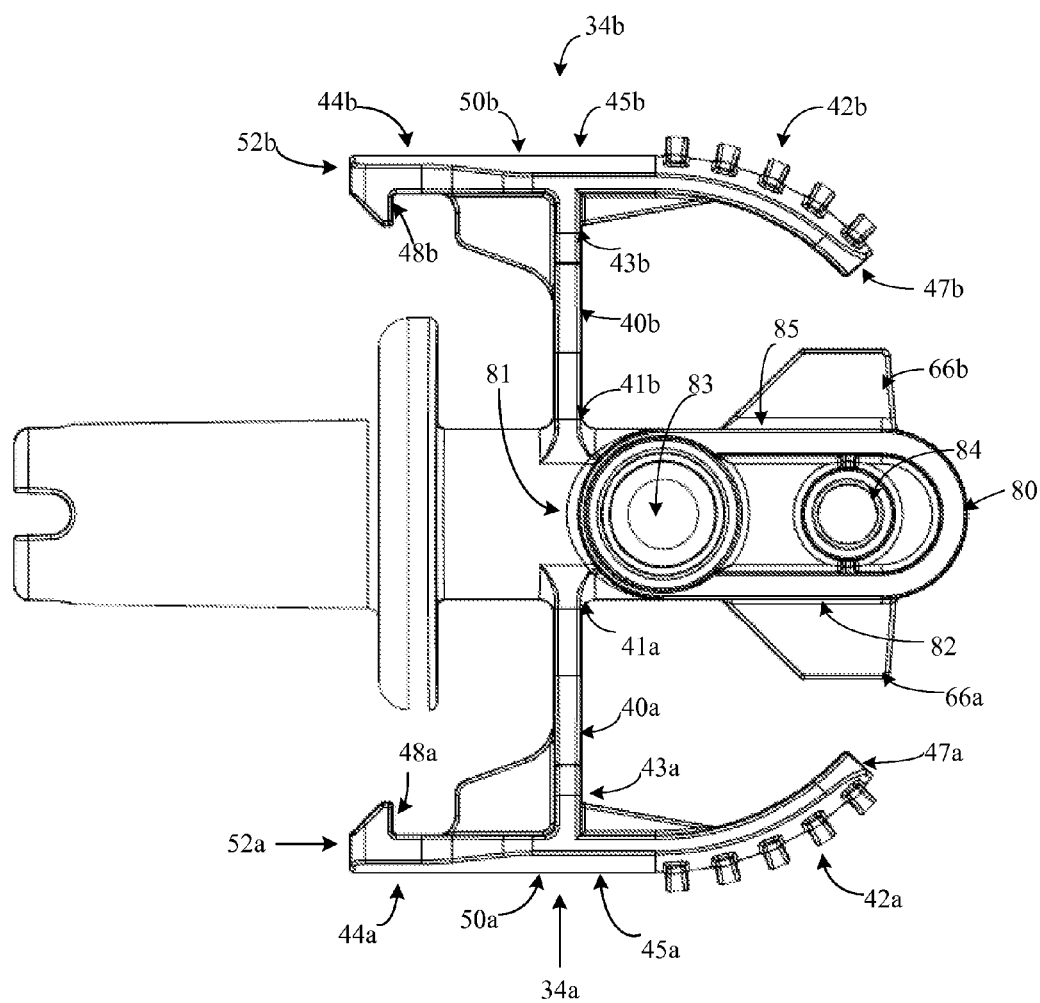
FIG. 10 of the drawings is a bottom plan view of the connector apparatus of the present disclosure.
Figure 11:
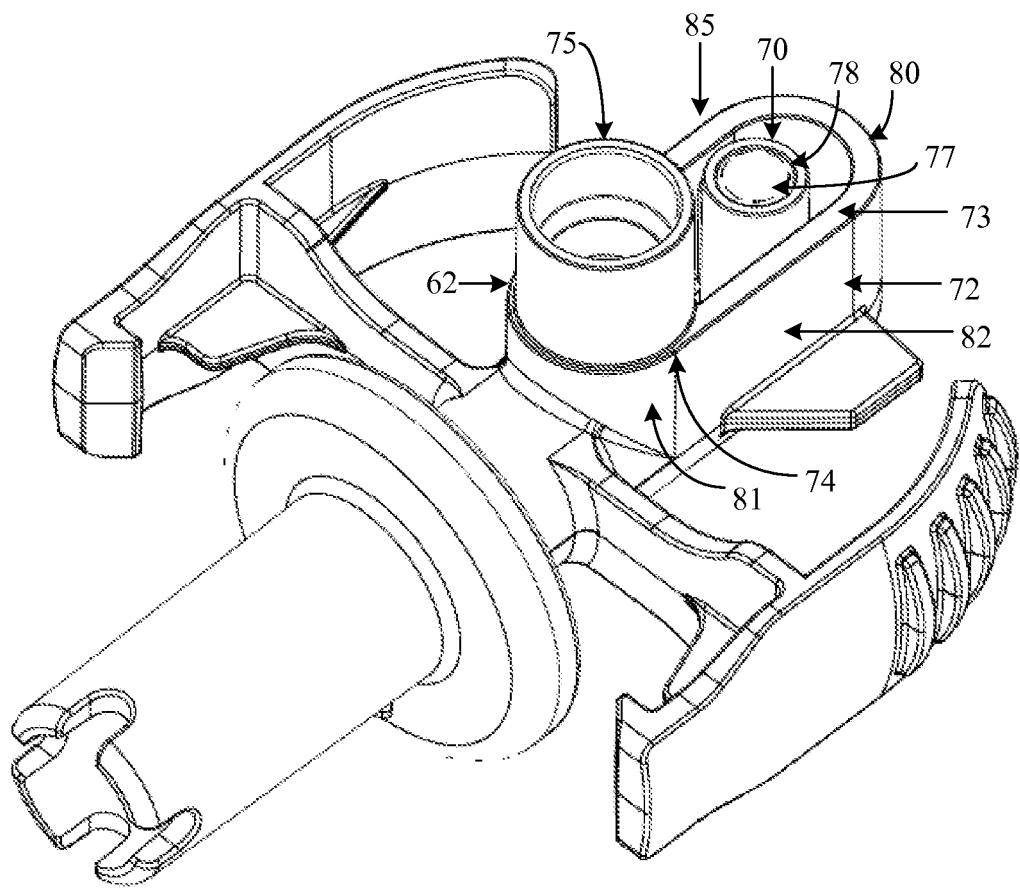
FIG. 11 of the drawings is a bottom perspective view of the connector apparatus of the present disclosure.
Figure 12:
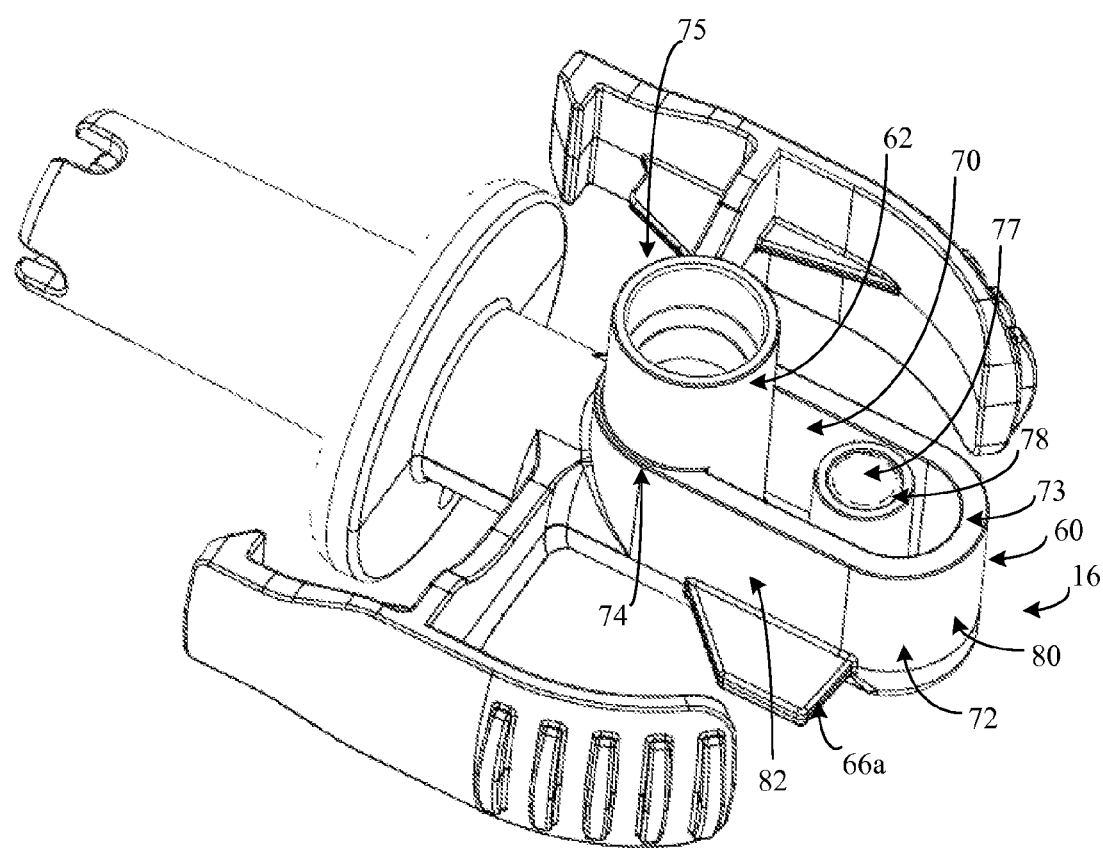
FIG. 12 of the drawings is a bottom perspective view of the connector apparatus of the present disclosure.

The connector 10 is shown in greater detail in FIGS. 5 through 7 in an environment coupled to the connector block 204 and the elongated fluid receiving member 206 of the docking station 200. The connector 10 is shown, in isolation in FIGS. 8 through 12 as comprising body 12, fluid supply connection subassembly 14 and docking station connection subassembly 16. In the configuration shown, the connector apparatus 10 comprises a single integrally formed or molded member (which may be formed from a polymer material, or a metal material, for example, and among others). While it is contemplated that multiple components may be combined to form the connector, the integrally formed or molded member provides enhanced rigidity and added integrity to the connector. In the configuration shown, the connector comprises a polymer member that is molded.

The body 12 of the connector 10 is shown as comprising fluid passageway 20, which couples the flexible package and the docking station in fluid communication, and which is defined by first end 22 and second end 24. The fluid passageway 20 includes first end outlet 25, second end outlet 26, first passageway portion 27 and second passageway portion 28. As can be seen, the two passageway portions are generally substantially perpendicular to each other. That is the first passageway portion 27 extends along a first axis 21 and the second passageway portion 28 extends along a second axis 23. The two axis generally lie in the same plane, and are substantially perpendicular to each other. The first passageway 27 has a generally conical configuration wherein the end of the first passageway portion that meets the second passageway portion 28 is of a smaller diameter than the end proximate the first end outlet 25. The second passageway portion 28 is of a generally uniform cross-sectional configuration (typically, substantially cylindrical), with the portion proximate the second end outlet 26 being outwardly tapered so as to receive and compress the sealing member 262, and to facilitate the joining of the docking station to the connector.

In the configuration shown, the length of the first passageway portion 27 is greater than that of the second passageway portion 28. In certain embodiments, the passageways may be of different geometric configurations, and may intersect at different angles relative to each other. In addition, varying inner configurations are contemplated for use.

The fluid supply connection subassembly 14 is shown as comprising flange 30, elongated probe 32, and locking fingers 34a, 34b. The fluid supply connection subassembly 14 is configured for the coupling of the connector 10 with a flexible package (through one of a plurality of different bag attachment/fitment structures, as will be explained). The flange 30 includes inner surface 53, outer surface 54 and outer rim 55. As will be explained below, the flange 30 interfaces with certain of the fitments associated with the flexible package (not shown) for engagement and positioning thereagainst. The flange 30 is typically a cylindrical member which is concentric with the first axis 21 of the first passageway 27.

The elongated probe 32 defines the first passageway 27 extending from the inner surface 53 of the flange 30. The elongated probe includes proximal end 36 which meets at the flange 30 and distal end 38. The probe 32 defines a substantially cylindrical member, centered about the first passageway and thereby defining the same. A plurality of notches are defined in the distal end of the elongated probe (and serve to define the first end outlet 25). In the embodiment shown, four u-shaped notches are positioned in a spaced apart relationship about the first end outlet 25. That is, each notch is spaced apart 90° of rotation. The length of the elongated probe is sufficient to seat into the fitment other structures (such as a cleaning station).

Figure 19:
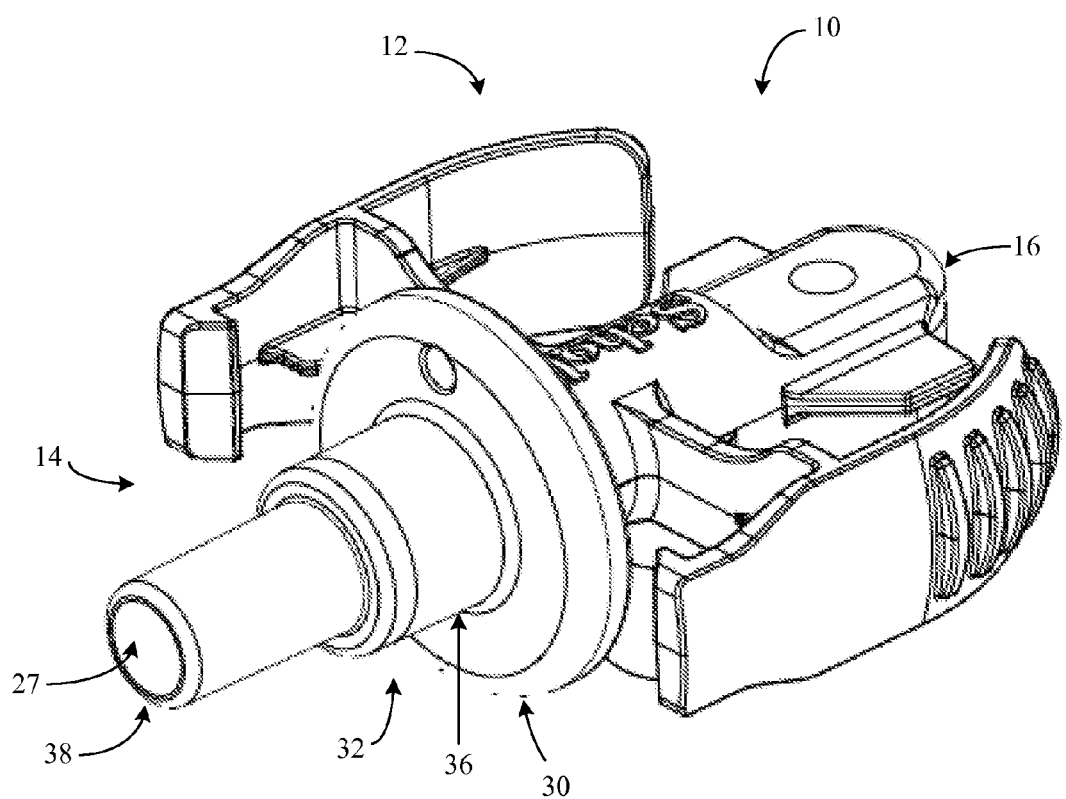
FIG. 19 of the drawings is a perspective view of the connector apparatus of the present disclosure

In another configuration of the connector, the elongated probe 32 includes an outer surface configuration which includes a step-down in diameter. For example, the elongated probe includes a first configuration which is of a first diameter, and a second configuration which is of a second diameter. Such a configuration is shown in FIG. 19. Such a configuration allows for the connection with a hose, wherein the hose extends over the second configuration and wherein the first configuration provides a stop for the hose and the further insertion of the hose. In the configuration shown, the second configuration is of a smaller diameter than the first, with the first configuration having a diameter that exceeds that of the hose, such that the hose is naturally precluded from insertion beyond the first portion, and the step between the same precludes further insertive movement of the hose member.

The locking fingers 34a, 34b are shown as providing a locking mechanism for coupling a spout and/or fitment of the flexible package (not shown) to the connector. The locking fingers 34a, 34b are substantial mirror images of each other on opposing sides of the connector body, symmetrically. Thus, the two are generally positioned 180° apart about the connector. As the two locking fingers are substantially identical, the locking finger 34a will be described with the understanding that locking finger 34b includes substantially the same components.

In particular, locking finger 34a includes spring post 40a, handle portion 42a and grasping portion 44a. The spring post 40a includes first end 41a and second end 43a. The spring post extends away from the body of the connector in a generally perpendicularly. In the configuration shown, the bendability, flexibility and force required to achieve the same can be determined by the material selection as well as the dimensional configuration thereof. Thus, in the configuration shown, the spring post 40a has a cross-sectional configuration that has a first thickness and a second thickness (defining a generally rectangular configuration). The orientation of the spring post 40a is such that the first thickness is smaller than the second thickness, and the first thickness lies substantially parallel to the first axis 21, and substantially perpendicular to the flange 30. The second thickness, being larger than the first thickness extends substantially perpendicular to the first axis 21 and substantially parallel to the flange 30. In this manner, less force is required to bend the spring post 40a toward and away from the first end outlet 25 than in a direction perpendicular thereto.

The handle portion 42a extends substantially perpendicularly from the second end 43a of the spring post in a direction toward the second end 24 of the body. The handle portion includes proximal end 45a and distal end 47a. It will be understood that the handle portion 42a provides a moment arm for the flexing of the spring post 40a. The grasping portion 44a extends from the second end 43a of the spring post in a direction opposite of the handle portion, or toward the first end 22 of the body. The grasping portion includes a proximal end 50a and a distal end 52a. A retaining flange 48a extends inwardly toward the body proximate the distal end 52*a*. In the configuration shown, the distal end 52*a*, and the retaining flange 48*a* extends beyond the flange 30 so as to engage a portion of the spout (as will be described below).

In the configuration shown, the handle portion 42*a* and the grasping portion 44*a* may appear continuous such that the proximal ends of each blend together. A plurality of gripping elements may be positioned on the outer surface of the handle portion 42*a* so as to provide a user with a gripping member to enhance the gripping thereof by a user. In the configuration shown, the gripping elements comprise a plurality of ridges. In other configuration, other structures may be utilized. In the configuration shown, although the handle portion 42*a* extends generally perpendicularly, the distal end thereof may be curved inwardly. Such a configuration provides for several advantages, including, but not limited to providing the desired range of movement, precluding inadvertent snagging of the handle portion, compacting the design, and enhancing the gripping of the user, among others.

In particular, locking finger 34*b* includes spring post 40*b*, handle portion 42*b* and grasping portion 44*b*. The spring post 40*b* includes first end 41*b* and second end 43*b*. The spring post extends away from the body of the connector in a generally perpendicularly. In the configuration shown, the bendability, flexibility and force required to achieve the same can be determined by the material selection as well as the dimensional configuration thereof. Thus, in the configuration shown, the spring post 40*b* has a cross-sectional configuration that has a first thickness and a second thickness (defining a generally rectangular configuration). The orientation of the spring post 40*a* is such that the first thickness is smaller than the second thickness, and the first thickness lies substantially parallel to the first axis 21, and substantially perpendicular to the flange 30. The second thickness, being larger than the first thickness extends substantially perpendicular to the first axis 21 and substantially parallel to the flange 30. In this manner, less force is required to bend the spring post 40*a* toward and away from the first end outlet 25 than in a direction perpendicular thereto.

The handle portion 42*b* extends substantially perpendicularly from the second end 43*b* of the spring post in a direction toward the second end 24 of the body. The handle portion includes proximal end 45*b* and distal end 47*b*. It will be understood that the handle portion 42*b* provides a moment arm for the flexing of the spring post 40*b*. The grasping portion 44*b* extends from the second end 43*b* of the spring post in a direction opposite of the handle portion, or toward the first end 22 of the body. The grasping portion includes a proximal end 50*b* and a distal end 52*b*. A retaining flange 48*b* extends inwardly toward the body proximate the distal end 52*b*. In the configuration shown, the distal end 52*b*, and the retaining flange 48*b* extends beyond the flange 30 so as to engage a portion of the spout (as will be described below).

In the configuration shown, the handle portion 42*b* and the grasping portion 44*b* may appear continuous such that the proximal ends of each blend together. A plurality of gripping elements may be positioned on the outer surface of the handle portion 42*b* so as to provide a user with a gripping member to enhance the gripping thereof by a user. In the configuration shown, the gripping elements comprise a plurality of ridges. In other configuration, other structures may be utilized. In the configuration shown, although the handle portion 42*b* extends generally perpendicularly, the distal end thereof may be curved inwardly. Such a configuration provides for several advantages, including, but not limited to providing the desired range of movement, precluding inadvertent snagging of the handle portion, compacting the design, and enhancing the gripping of the user, among others.

The docking station connection subassembly includes frame 60, elongated spout 62, coupling structure 76 and flanges 66*a*, 66*b*. Frame 60 includes inner cavity 70, side surface 72, upper surface 71 and base rim 73. The inner cavity 70 of the frame 60 comprises a generally elongated oval shape defined by opposing semi-circular end configurations 80, 81 (defining half cylinders) separated by a rectangular configurations 82, 85. Each of the semi-circular end configurations having a center point 83, 84, respectively. The upper surface 70 includes a fastener receiving portion 86 which includes an area which is generally planar and parallel to the base rim 73. The base rim 73, the side surface 72 and the upper surface 71 defining inner cavity 70. In the configuration shown, the docking station connection subassembly, and, in particular the frame is elongated in the direction aligned with the first axis 21. In the configuration shown, the width of the frame generally corresponds to the width of the body proximate the flange. The length of the frame is generally three times that of the width. Of course, variations are contemplated, but such a width to length ratio provides the necessary strength and integrity to the connection between the docking station and the connector assembly. Additionally, the height of the frame is such, along with the positioning of the same, that the frame is within the footprint of the flange 30, with the elongated probe extending therebeyond. Additionally, the frame is spaced apart from the flange 30 a distance generally corresponding to the position of the spring posts 40*a*, 40*b*, such that bending of the spring posts through manipulation of the locking fingers does not affect the integrity of the frame member, or the interface between the elongated probe and the docking station.

The elongated spout 62 extends from proximal end 74 to distal end 75 which extends beyond the base rim 73 and defines the second end outlet 26. In the configuration shown, the second axis 23 corresponds to the center point 84. The elongated spout is generally perpendicular to the plane defining the base rim 73. In the configuration shown, the outer surface of the elongated spout is substantially uniform below the base rim 73, and tapers outwardly on the inner surface (i.e., the passageway).

The coupling structure 76 includes an elongated slot defining an opening in the upper surface 71 and extending below the base rim 73. The elongated slot generally defines an axis that is offset from the center point 83 toward the center point 85 and is substantially perpendicular to the base rim 73, as well as the fastener receiving portion 86. In the configuration shown, the elongated slot and the elongated spout lie along an axis that bisects the rectangle between the opposing sides thereof, and transversely through the semi-circles defining the opposing configuration of the docking station connection assembly.

The opposing flanges 66*a*, 66*b* extend outwardly from the side surfaces of the frame and corresponding to the opposing locking fingers 34*a*, 34*b*. That is, upon rotation of the opposing locking fingers through the pressing of the handle portions 42*a*, 42*b* toward each other, the opposing flanges 66*a*, 66*b* define the respective stop for each one of the handle portions. That is, the end of range of motion is realized when the handle portions contact the respective opposing flange.

Figure 3:
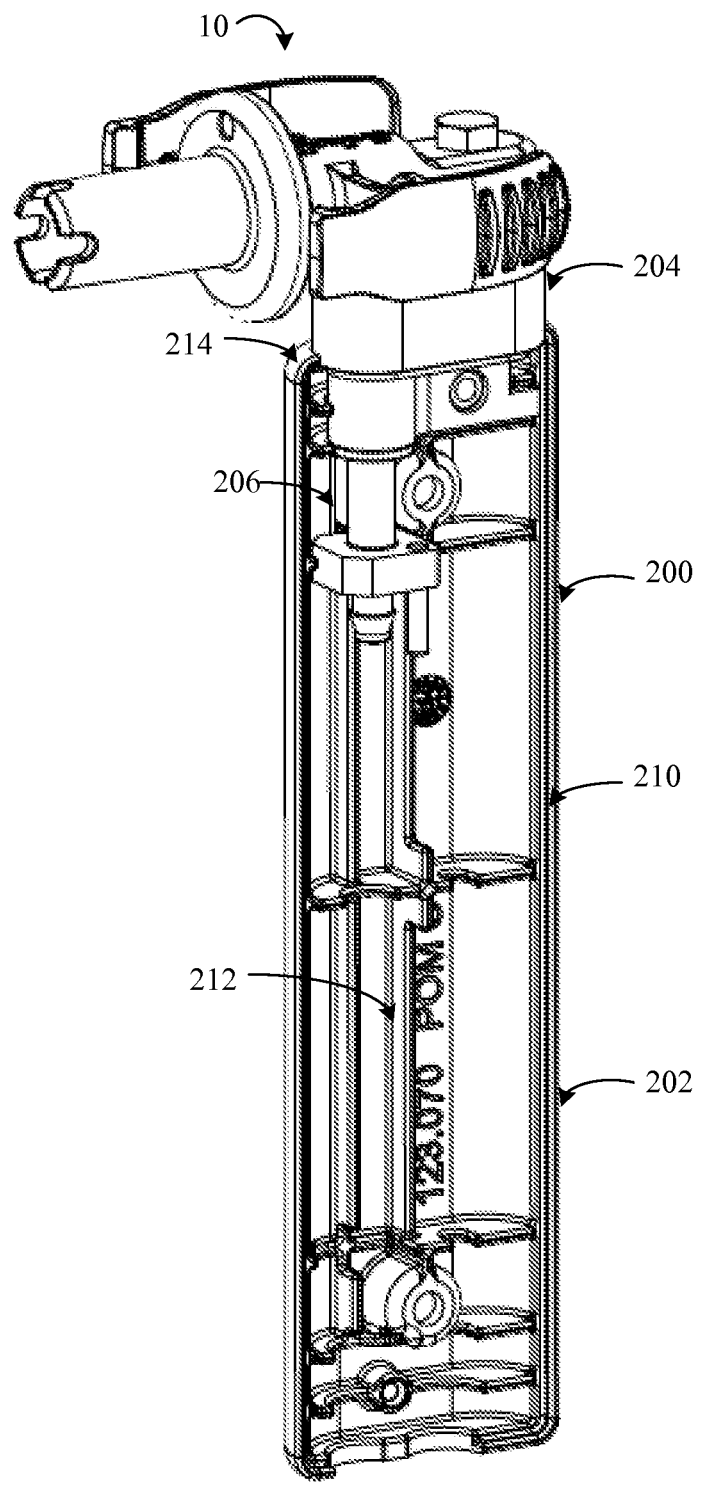
FIG. 3 of the drawings is a perspective view of the connector apparatus of the present disclosure, shown with a portion of the grasping body of the docking station being removed.

With reference to FIG. 3, the docking station 200 includes grasping body 202, connector block 204 and elongated fluid receiving member 206. The docking station forms a portion of a dispenser which is configured to dispense fluid from within the flexible package through the connector apparatus. The docking station body generally comprises a graspable portion that includes an elongated body having an outer surface 210 which forms an inner cavity 212. Access to the inner cavity is gained through the upper opening 214. In the configuration shown, the grasping body includes a pair of halves (as is shown, in the constructed configuration in FIG. 1) that are coupled together through fasteners and the like.

Figure 13:
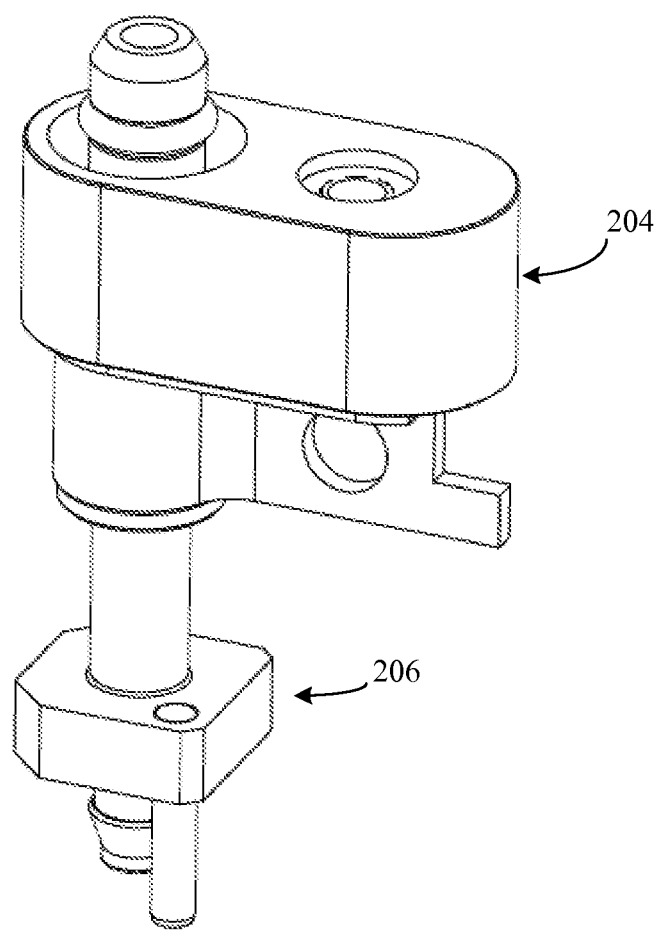
FIG. 13 of the drawings is a perspective view of the connector block and the elongated fluid receiving member of the docking station that is coupled to the connector assembly of the present disclosure.
Figure 14:
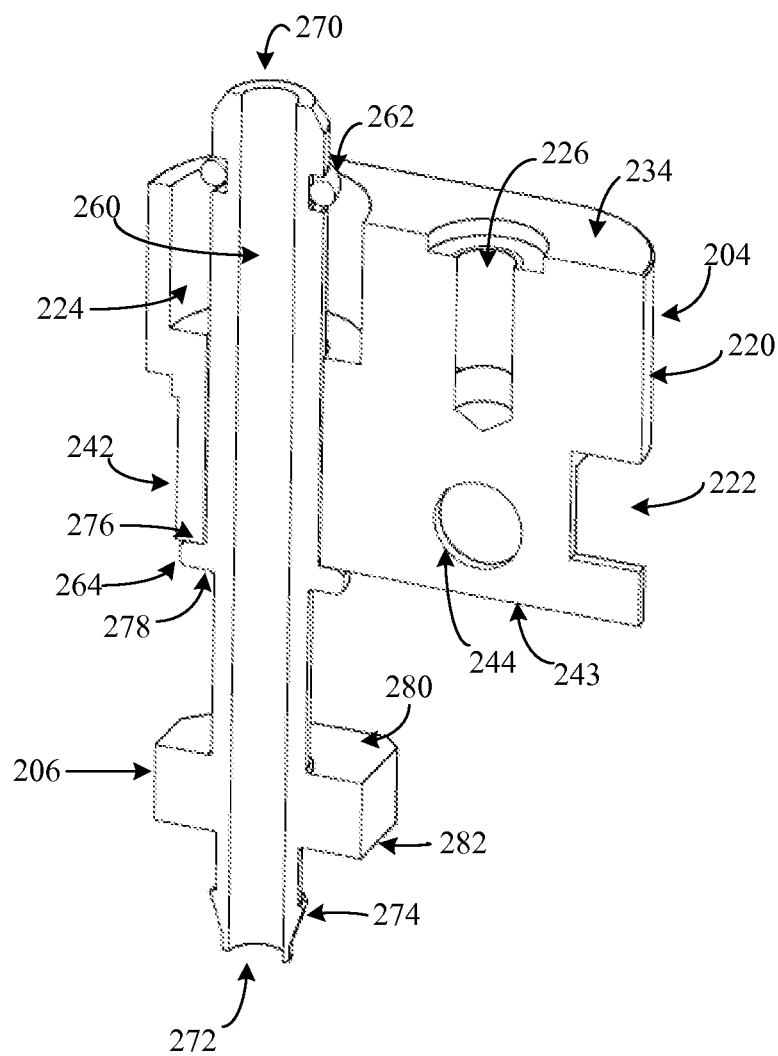
FIG. 14 of the drawings is a perspective cross-sectional view of the connector block and the elongated fluid receiving member of the docking station that is coupled to the connector assembly of the present disclosure.
Figure 15:
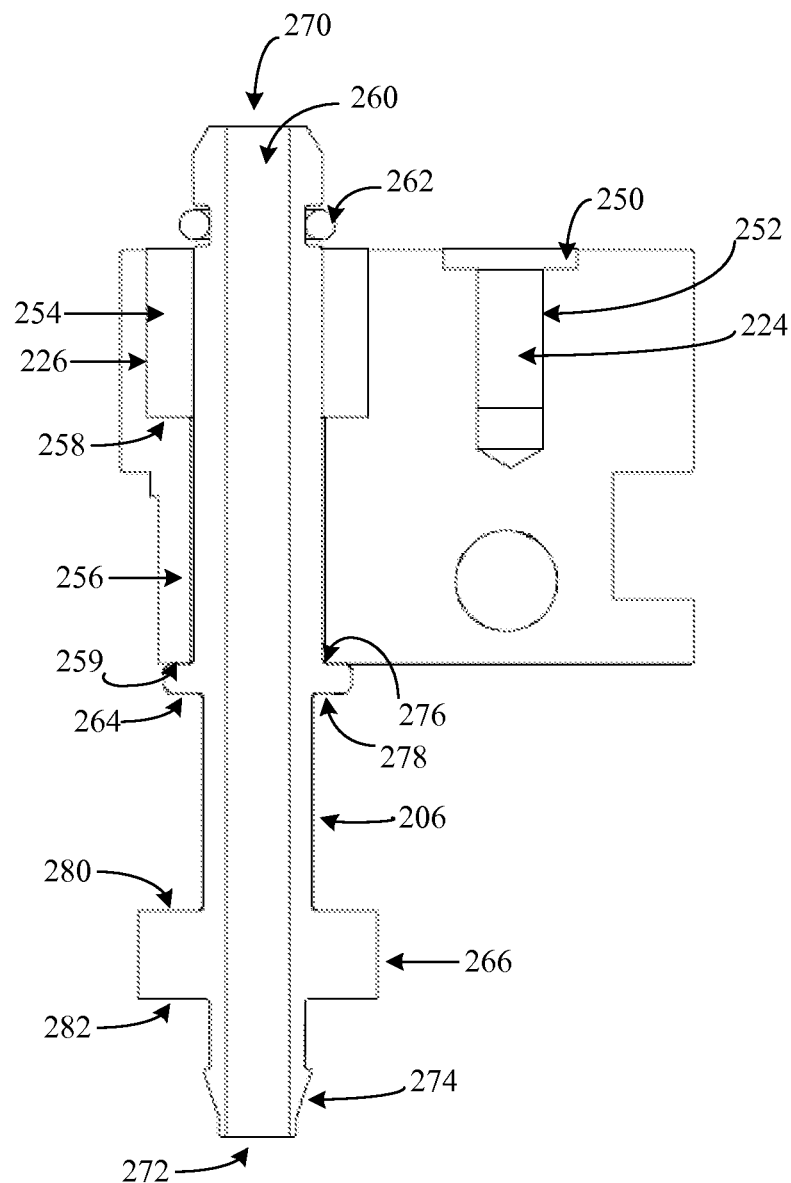
FIG. 15 of the drawings is a cross-sectional view of the connector block and the elongated fluid receiving member of the docking station that is coupled to the connector assembly of the present disclosure.
Figure 16:
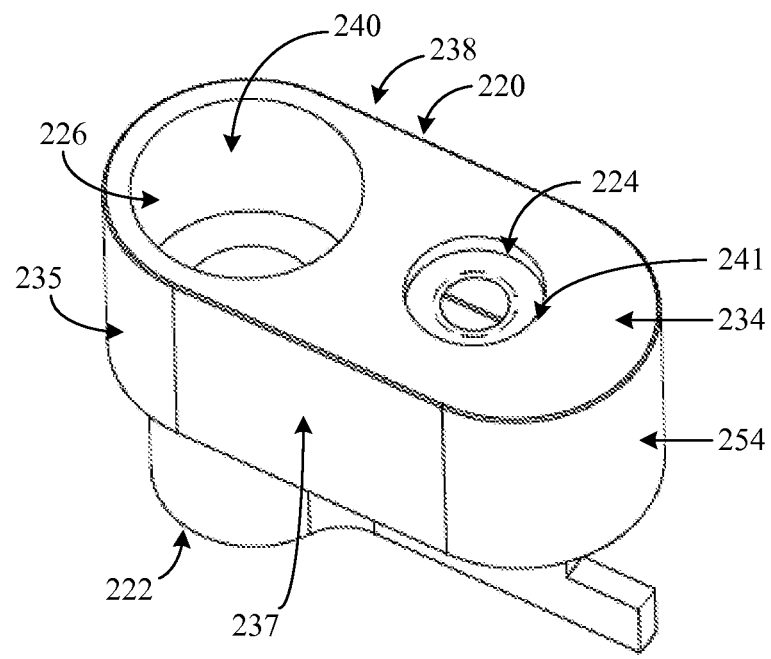
FIG. 16 of the drawings is a perspective view of the connector block of the docking station that is coupled to the connector assembly of the present disclosure.
Figure 17:
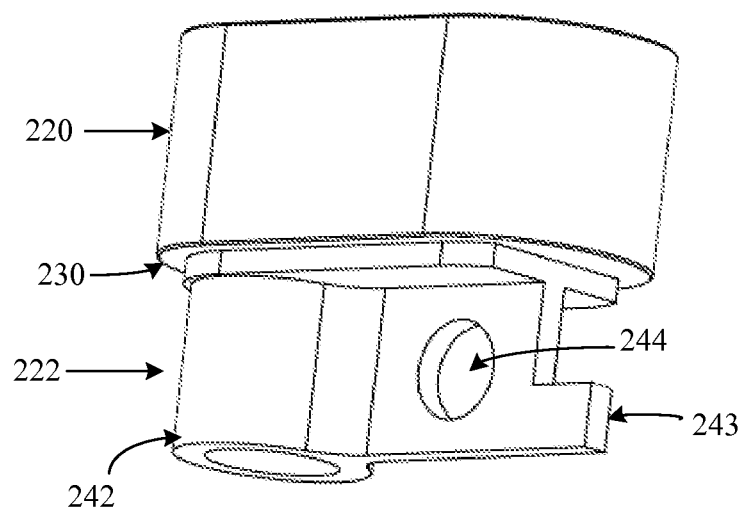
FIG. 17 of the drawings is a perspective view of the connector block of the docking station that is coupled to the connector assembly of the present disclosure.

The connector block 204 and the elongated fluid receiving member 206 are shown coupled to the connector in FIGS. 5 through 7. The connector block and the elongated fluid receiving member are shown in FIGS. 13 through 15 in a coupled configuration, with the block body being shown in isolation in FIGS. 16 and 17, and the elongated fluid receiving member 206 being shown in isolation in FIG. 18. With particular reference to FIG. 14 through 17, the connector block 204 includes block body 220, lower portion 222, first opening 224 and second opening 226. The connector block facilitates the attachment of the docking station to the connector assembly. In the configuration shown, the connector block includes a portion which is maintained within the cavity of the grasping body and a portion which extends through the upper opening 214. The connector block is preferably formed from a metal member, such as, for example, stainless steel, although other materials are contemplated as well.

The block body 220 includes lower seat surface 230 which interfaces with the upper opening 214 of the grasping body, side surface 232 and upper surface 234. The side surface 232 includes first semi-circular portion 235, second semi-circular portion 236, first rectangular portion 237 and second rectangular portion 238. The configuration mimics the configuration of the outer surface 72 of the frame 60 of the docking station connection subassembly of the connector. The upper surface 234 is substantially planar, in the configuration shown, and includes center point 240 and center point 241 which are defined by the center of the respective semi-circular portions 235, 236.

The lower portion 222 extends below the block body, and the lower seat surface thereof. The lower portion includes tube receiving portion 242 and tapered portion 243 which defines a transverse flange with a transverse opening 244 extending therethrough. It will be understood that a fastener is extended through the transverse opening 244 and coupled to the grasping body 202 to secure the two in operable engagement.

The first opening 224 extends through the upper surface 234 and includes countersink portion 250 and threaded portion 252. The first opening is generally perpendicular to the upper surface 234 and is generally extending at a point spaced apart from the center point 240 and toward center point 241 of the upper surface. The first opening is generally parallel to the side surfaces.

The second opening 226 includes upper countersink portion 254 and lower portion 256. The lower portion 256 extends through the tube receiving portion 242 of the lower portion 222. The upper countersink portion is within the block body 220. The two meet at the step surface 258. It will be understood that the step surface may be positioned within the block body or the lower portion, as well as between the two portions (such that it is captured in each portion). The lower portion terminates at the bottom surface 259 which corresponds to a lower surface of the lower portion.

The first opening and the second opening correspond to the elongated spout and the coupling structure so as to form a portion of the engagement of the same. Thus, the spacing and relative position of each is such that they correspond. In addition, it is preferred that the side surface of the block body and the side surface of the docking station substantially match. In the embodiment shown, the side surface of the frame of the docking station connection subassembly is smaller than the side surface of 232 so that the base rim 73 rests upon the upper surface 234 of the block body, while following the contours of the block body.

Figure 18:
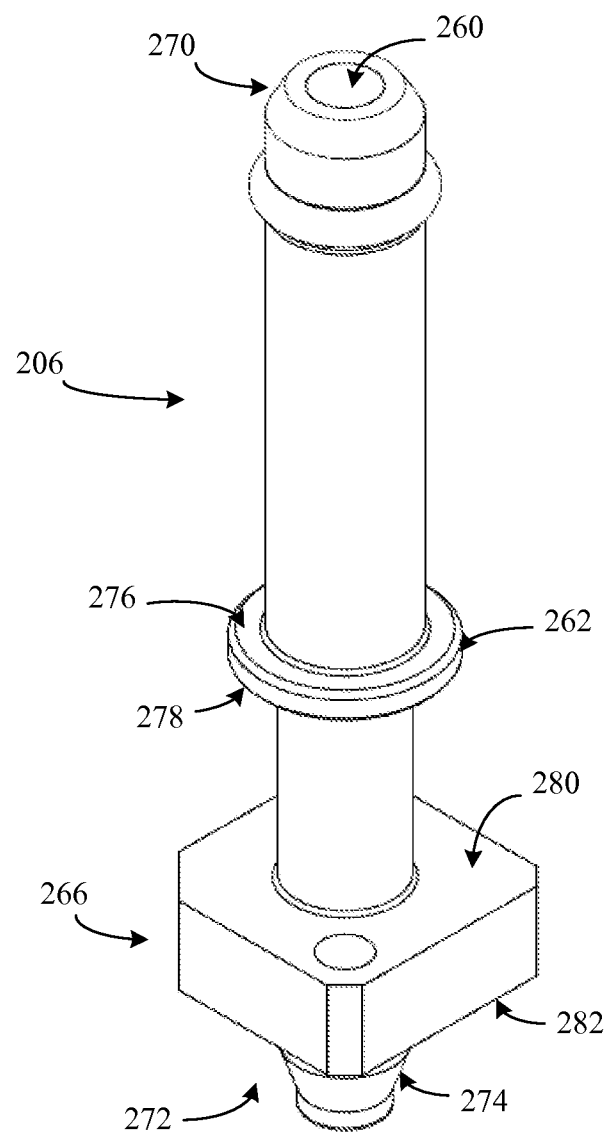
FIG. 18 of the drawings is a perspective view of the elongated fluid receiving member of the docking station that is coupled to the connector assembly of the present disclosure.

The elongated fluid receiving member 206 is shown in isolation in FIG. 18 as comprising elongated tubular passage 260, upper seal 262, upper flange 264 and lower flange 266. The elongated tubular passageway defines a first end 270 and a second end 272. The second end includes a barbed portion 274. The upper seal 262 extends in a groove that is spaced apart from the first end 270, and is configured to sealingly engage the elongated spout 62 of the docking station connection subassembly 16.

The upper flange 264 extends generally perpendicular to the elongated tubular passage spaced apart from the first end and the second end of the elongated tubular passage 260. The upper flange includes an upper surface 276 and a lower surface 278. As will be explained, the upper flange 264 engages the bottom surface of the second opening 226 of the connector block 204. The upper flange has a generally cylindrical disc like configuration.

The lower flange 266 is disposed between the upper flange and the second end of the elongated tubular passageway. The lower flange is generally parallel to the upper flange and includes upper surface 280 and lower surface 282. A locating pin 284 extends from the lower surface 282. The lower flange has opposing flattened surfaces, so that in the configuration shown, the lower flange has a substantially square configuration. The lower flange engages the grasping body of the docking station, so as to preclude rotation of one relative to the other. As will be explained, the lower flange forms a stop for a hose that is coupled to the second end, among other functions.

To assemble the docking station, the elongated fluid receiving member 206 is coupled to the connector block 204. To achieve the same, the elongated fluid receiving member is extended through the second opening 226 until the upper flange 264 seats against the bottom surface of the first opening 226. The upper seal 262 can be positioned thereafter. As can be seen in the assembly, the first end 270 of the elongated fluid receiving member 260 extends through the upper countersink portion and beyond the upper surface 234 of the block body. In the configuration shown, the upper seal 262 extends beyond the upper surface of the block body 220. In the configuration shown, the second opening and the elongated tubular member are coaxial with the lower portion of the second opening corresponding in shape and size to the elongated tubular passage so as to form a substantially tight fit therebetween. The first end 270 of the elongated tubular passage may be tapered to as to facilitate improved coupling with the connector apparatus.

Once the structures are joined, the grasping body 202 can be introduced. In particular, prior to assembly of the grasping body halves, the connector block and the elongated fluid receiving member are positioned within the cavity of the grasping body, with the block body 204 (with a portion of the elongated fluid receiving member 206 extending out of the grasping body through the upper opening 214. It will be understood that other structures (such a tubing or conduit among others) may be coupled to the elongated fluid receiving member prior to or after the grasping body is coupled.

Once the docking station 200 is formed, the connector apparatus 10 may be coupled thereto. To effectuate the same, the connector apparatus is directed toward and into contact with the docking station. More particularly, the elongated tubular passage 260 is directed into the second outlet of the elongated spout 62 of the docking station connection subassembly. The two matingly engage and, along with upper seal 262 provide substantially fluid tight fluid communication therebetween. The base rim 273 comes into contact with the upper surface 234 of the block body 220. The two can be rotated about the elongated spout until the tubular passageway 77 of the docking station connection subassembly 16 lines up with the second opening 226 of the connector block. When these line up, the tubular passageway 77 extends into the countersink 250 of the first opening. A fastener can be extended through the tubular passageway and into the threaded portion 252 of the first opening on the connector block to releasably secure the same. In the configuration shown, a threaded fastener is utilized which seats against the fastener receiving portion 86 of the upper surface 71 of the docking station.

It will be understood that any number of connections may be coupled to the fluid supply connection subassembly, including but not limited to hoses and fitments and spouts. For example, a commonly utilized hose fitting that extends from a bag can be coupled to the fluid supply connection subassembly. In other configurations, and with reference to FIG. 4, a fitment, such as the QSS fitment from Scholle Corporation may be utilized. One such fitment is shown in U.S. Pat. No. 8,448,799 issued to Thurman, et al, and assigned to Scholle Corporation of Irvine, Calif. Of course, the configuration is not limited to use in association with such a bag.

Figure 4:
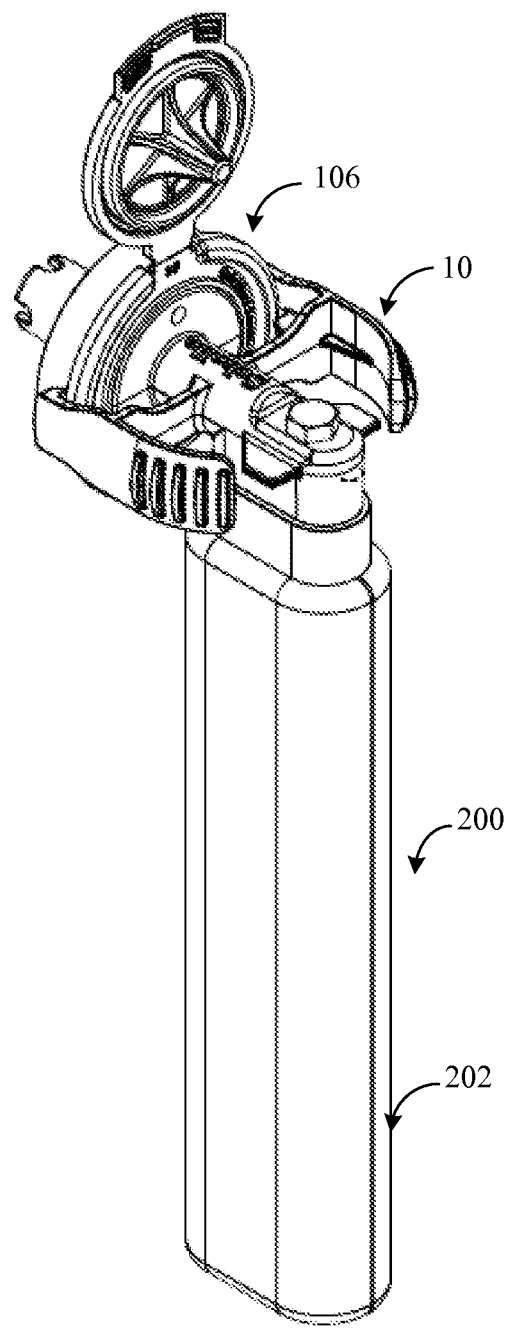
FIG. 4 of the drawings is a perspective view of the connector apparatus of the present disclosure, showing, in particular, a configuration wherein the connector apparatus is coupled to a docking station through a connector block, and wherein the connector apparatus is coupled to a fitment (which, as will be understood to one of ordinary skill in the art, is coupled to a fitment of a flexible bag and in fluid communication with the cavity of such a flexible bag)

When utilized in association with a fitment such as the fitment shown in the '799 patent, and shown in FIG. 4, the fitment structures interface with the fluid supply connection subassembly 14. In particular, the elongated probe 32 extends through the opening in the fitment. Next, the elongated probe is directed into the flexible bag until the flange 30 seats within the inner cavity of the fitment. The flange forms a stop precluding further insertion, and also shape matingly matches the configuration of the cavity of the fitment. This shape mating matching serves to center the elongated probe within the opening of the fitment.

As the end of travel is reached, the locking arms 34a, 34b extend beyond an outer rim of the fitment and the grasping portion 44a, 44b extend over and retainingly engage the outer rim of the fitment. The natural biasing of the spring post 40a, 40b outwardly moves the grasping portion 44a, 44b upon insertion of the probe, with the spring post 40a, 40b directing the respective grasping portion 44a, 44b toward the fitment to capture the outer rim with the retaining flanges 48a, 48b of the grasping portion.

To disconnect the fitment from the connector apparatus, the user must first depress the handle portions 42a, 42b so as to bend the spring posts and move the grasping portions 44a, 44b away from the fitment to a sufficient point that the outer rim can slide beyond the grasping portions 44a, 44b allowing for refraction of the elongated probe 32 from within the fitment.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:
1. A connector apparatus comprising:
a body defining a fluid passageway, the fluid passageway defining a first passageway portion and a second passageway portion generally perpendicular to the first passageway portion, the first passageway portion including a first end outlet and the second passageway portion including a second end outlet;
a fluid supply connection subassembly at the first end of the body, the fluid supply connection subassembly including an elongated probe defined by the first end outlet;
a docking station connection subassembly at the second end of the body, the docking station connection assembly including an elongated spout defining the second end outlet, the elongated spout extending from a frame including an outside surface and a base rim, the base rim defining a plane with the elongated spout extending therebeyond, the elongated spout defining an elongated spout axis,
wherein the docking station connection subassembly further includes a coupling structure which includes a fastener passageway with a fastener receiving portion at an upper end thereof, the fastener passageway defining a fastener passageway axis, with the fastener passageway axis being spaced apart from the elongated spout axis and substantially parallel thereto, and with the fastener passageway positioned within the frame.

2. The connector apparatus of claim 1 wherein the frame comprises a substantially oval with the base rim defining a plane that is substantially parallel to a plane defined by the second end outlet, and substantially perpendicular to a plane defined by the first end outlet.

3. The connector apparatus of claim 2 wherein the frame includes a first semi-circular end, a second semi-circular end with a pair of rectangular portions extending therebetween so as to define the oval configuration.

4. The connector apparatus of claim 3 wherein the frame defines a width and a length, the length of the frame being larger than the width by approximately a ratio of 3:1.

5. The connector apparatus of claim 3 wherein the first semi-circular end defines a center point, with the center point of the first semi-circular end defining a longitudinal axis of the elongated spout.

6. The connector apparatus of claim 3 wherein the elongated spout and the fastener passageway of the coupling structure define a line that bisects the frame along a longitudinal axis extending therethrough.

7. The connector apparatus of claim 3 wherein the fluid supply connection subassembly further comprises a flange spaced apart from the first end outlet defining a proximal end of the elongated probe, and a pair of opposing locking fingers, each of the locking fingers including a spring post extending outwardly from the body on an opposite side of the flange from the first end opening, a handle portion extending away from a distal end of the spring post away from the first end opening, and a grasping portion extending from the distal end of the spring post toward the first end, terminating between the flange and the first end opening, with a retaining flange extending inwardly from a distal end of the grasping portion, so as to retain an outer rim of a fitment upon insertion of the elongated probe therethrough.

8. An assembly including a docking station and a connector apparatus:
the docking station including,
a connector block having a block body with an upper surface, a side surface, an upper surface and a lower portion, the lower portion attachable to a grasping body, a first opening extending through the upper surface of the connector block; and a second opening extending through the upper surface of the connector block, the second opening having an upper countersink portion and a lower portion, wherein the lower portion is of a smaller diameter than the upper portion, with a step surface extending therebetween; and an elongated fluid receiving member defining a tubular passageway with a first end and a second end, the elongated fluid receiving member extending through the second opening of the connector block, with the first end extending beyond the upper surface of the block body;

the connector apparatus comprising, a body defining a fluid passageway, the passageway defining a first passageway portion and a second passageway portion generally perpendicular to the first passageway portion, the first passageway portion including a first end outlet and the second passageway portion including a second end outlet;

a fluid supply connection subassembly at the first end of the body, the fluid supply connection subassembly including an elongated probe defined by the first end outlet;

a docking station connection subassembly at the second end of the body, the docking station connection assembly including an elongated spout defining the second end outlet, the elongated spout extending from a frame including an outside surface and a base rim, the base rim defining a plane with the elongated spout extending therebeyond, wherein the first end of the elongated fluid receiving member extends into the second end outlet and into the second passageway portion, with the second end outlet extending into the upper countersink portion of the second opening, with the base rim interfacing with the upper surface of the block body.

9. The assembly of claim 8 wherein the side surface of the block body substantially corresponds in shape to the frame of the docking station connection subassembly.

10. The assembly of claim 9 wherein the docking station subassembly further includes an opening corresponding to the first opening of the connector block, with the first opening of the connector block including a thread formed thereon, and a fastener extending through the opening of the docking station subassembly and into the first opening of the connector block, sandwiching the docking station subassembly therebetween.

11. The assembly of claim 10 wherein the opening of the first docking station subassembly further includes an elongated passageway, and the first opening of the connector block includes a countersink portion proximate the upper surface of the block body, with the elongated passageway extending into the countersink portion of the first opening of the connector block upon positioning of the connector apparatus into engagement with the connector block.

12. The assembly of claim 11 wherein the elongated fluid receiving member further includes an upper flange, the upper flange including an upper surface that limits further movement of the elongated fluid receiving member within the connector block.

13. The assembly of claim 11 wherein the elongated fluid receiving member further includes an upper seal spaced apart from the first end thereof and spaced apart from the second opening of the block body of the connector block.

14. The assembly of claim 11 wherein the fluid supply connection subassembly further comprises a flange spaced apart from the first end outlet defining a proximal end of the elongated probe, and a pair of opposing locking fingers, each of the locking fingers including a spring post extending outwardly from the body on an opposite side of the flange from the first end opening, a handle portion extending away from a distal end of the spring post away from the first end opening, and a grasping portion extending from the distal end of the spring post toward the first end, terminating between the flange and the first end opening, with a retaining flange extending inwardly from a distal end of the grasping portion, so as to retain an outer rim of a fitment upon insertion of the elongated probe therethrough.

* * * * *